Dec. 12, 1967 GERHARD-GÜNTER GASSMANN 3,358,183

AUTO-OSCILLATING HORIZONTAL DEFLECTION CIRCUITRY
PARTICULARLY FOR TELEVISION SETS

Filed March 30, 1964 2 Sheets-Sheet 1

INVENTOR
GERHARD-GÜNTER GASSMANN

BY Philip M. Bolton

ATTORNEY

INVENTOR
GERHARD-GÜNTER GASSMANN

BY Philip M. Bolton
ATTORNEY

United States Patent Office 3,358,183

Patented Dec. 12, 1967

3,358,183

AUTO-OSCILLATING HORIZONTAL DEFLECTION CIRCUITRY PARTICULARLY FOR TELEVISION SETS

Gerhard-Günter Gassmann, Berkheim, Wurttemberg, Germany, assignor to International Standard Electric Corporation, New York, N.Y., a corporation of Delaware Filed Mar. 30, 1964, Ser. No. 355,761
Claims priority, application Germany, Apr. 9, 1963, St 20,488; June 14, 1963, St 20,731; Oct. 9, 1963, St 21,167
1 Claim. (Cl. 315—27)

The invention relates to a self-oscillating horizontal deflection circuitry, particularly for television sets in which the control electrode of a controllable element (e.g. a tube), serving as a switching means, is operated through a sine-oscillating circuit to which energy is led via a feedback winding.

Horizontal deflection circuits in television sets are in general operated by a separate deflection oscillator. In order to reduce expenditure various circuit arrangements were proposed in which the output stage oscillates in itself. But these circuit arrangements known did not succeed because they show various drawbacks.

In one of the auto-oscillating output stages known a voltage is led to the control grid of the output stage from the line transformer via resistance/capacitance elements. This arrangement is particularly unstable with regard to the frequency.

To improve this it was proposed in another auto-oscillating output stage known to use a sine-oscillating circuit as a frequency determining element. Since the output stage for the horizontal deflection essentially shall serve only as an electronic switching means the starting operation must be designed in such a way that the output stage can be blocked and unlocked in a relatively short time. To this end the output stage may be operated for example with a rectangular voltage. The voltage of a frequency-stable oscillating circuit, however, is sinusoidal. In order to obtain the same effect as for operation with a rectangular voltage an ohmic resistor was inserted as cutting element between the sine-oscillating circuit and the control grid of the output stage. The circuitry is thereby arranged in such a way that during a positive half wave of the sine-voltage a grid current flows and as a consequence of said grid current (during the positive half wave) the input resistance of the output stage is small. Due to this the positive half wave drops at the coupling resistor and only a negative half wave voltage is at the control grid the amplitude of said voltage is so large that the tube is cut off and made conductive in a relatively short time, obtaining thereby the same effect as by the use of a rectangular voltage. For horizontal deflection output stages in television sets it is of particular importance that they can be blocked quickly, because immediately after blocking the kick-back pulse occurs at the plate which may amount to 5000 volts, for example. If the tube would not be completely blocked during said period very high losses would occur. Due to the gride-plate capacity of the output stage the kick-back pulse on the plate side is also led to the grid. In order to minimize this effect it is necessary to make the coupling resistor correspondingly small and the operating voltage correspondingly high. This mandatory condition ensues that either a very high attenuation of the oscillating circuit by the coupling resistor and, consequently, a very small frequency stability during the modification of the beam current for the picture tube must be encountered or the impedance of the oscillating circuit must be selected very small, too. However, a small oscillating impedance and a high oscillating voltage, in addition, demand a relatively high reactive idle power for the oscillating circuit.

On the other hand, one demands from a horizontal deflection circuitry that it can be precision-tuned at least by ±600 c./s., if possible however by ±800 c./s. So large a precision tuning range in a circuit with a high reactive power demands a reactance stage which furnishes a very high reactive current. Such a stage is not only very expensive, but it consumes also very much current. Therefore this solution of the problem must be disregarded for economical reasons.

In order to reduce the reactive power a winding of the line transformer was series-connected with the coupling resistor in another circuit arrangement known. Thereby it is achieved that the positive kick-back voltage across the plate of the output stage is also led to the control grid, but in reversed polarity. It is thereby secured that the tube is blocked during the kick-back pulse. The magnitude of the sine-voltage and, consequently, the magnitude of the reactive power can be reduced by this measure. But said measure leads to other considerable drawbacks. For example, no lagging phase shift shall occur between the negative kick-back impulse at the grid and the kick-back impulse at the plate of the output stage, because the output stage during the kick-back pulse at the plate is not sufficiently blocked. Such a phase shift can easily occur due to the varying scattering inductivities of the different parts of the windings of the line transformer. Moreover, the amplitude of the sine-voltage can be reduced by this measure only by the factor 2 or maximum, by the factor 3, because otherwise due to partial oscillating circuits of the line transformer (formed by the scattering inductivities and winding capacities) an undesired stray oscillation can occur within a part of the sine-period, which oscillation may become so heavy that it completely suppresses the sine-voltage. The reactive power gain by this measure is not very high and, moreover, requirements are set up which demand a narrow tolerance for the line transformer.

In order to avoid these drawbacks it is proposed by this invention for a self-oscillating horizontal deflection circuitry, particularly for television sets in which the control electrode of a controllable, active element (e.g. a tube) serving as a switching means is operated through a sine-oscillating circuit which receives its energy via a feedback winding, to provide in the line including the sine-oscillating circuit a capacitor the reactance of which is so high that the input resistance of the controllable active element during the conductive period of the capacitor is essentially smaller and during its cut-off period essentially higher than said reactance.

In the circuit arrangement according to the invention the reduction of the reactive power is achieved in that a capacitor serves as coupling element. During a part of the period in which the control electrode of the active element is under current and, consequently, the input resistance is very low, said reactance is in parallel to the sine-oscillating circuit. The reactance cannot perceivably attenuate the oscillating period of the circuit during said time portion, but changes only the duration of the half wave. During the other portion of the period no current or a current which can be neglected flows in the control electrode; during this portion of the period the coupling capacitor is not in parallel to the oscillating circuit. The oscillating circuit voltage in the circuit arrangement according to the invention possesses two sinusoidal portions which however are aligned to two different frequencies. In this circuit arrangement no attenuation occurs due to a coupling resistor so that the impedance of the oscillating circuit can considerably be increased without impairing the stability of the frequency. The necessary reactive power is heavily reduced by this mode, avoiding that the reactance stage must furnish an excessively large reactive current.

The invention is now in detail explained with the aid of examples shown on the accompanying drawings.

FIG. 1 shows a circuit arrangement according to the invention in which a tube is used as line output stage, i.e. as controllable active element.

FIG. 2 wherein the same references are used for the same components shows a somewhat deviating example of FIG. 1. In this FIG. a diode is used instead of a leakage resistor 12 of FIG. 1.

Figure 1:
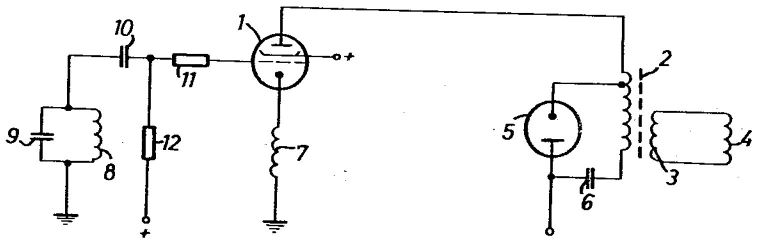

FIG. 1 shows a circuit arrangement according to the invention. The line output stage is indicated by 1, i.e. the controllable, active element, 2 represents the line transformer with a secondary winding 3, from which the deflection unit 4 is power-fed, 5 indicates the switching diode and 6 the booster-capacitor. This part of the circuit arrangement connected with the plate of the output stage has nothing directly to do with the object of the invention. 7 indicates a feed-back winding inserted in the cathode circuit, said winding is coupled with the inductivity 8 of the oscillating circuit. 9 shows the capacitor of the oscillating circuit. The oscillating circuit voltages led to the control grid of the tube via capacitor 10. Immediately in front of the control grid a resistor 11 is provided the resistance value of which can be neglected for the circuit arrangement and which only serves to suppress VHF-oscillations. To deduct the charging led to one layer of the capacitor 10 by the grid current the resistor 12 is used which is connected with a positive voltage. The value of said resistor is thereby essentially higher than the reactive resistance of the capacitor. The attenuation of the circuit caused by it is so small that it can be neglected. The average value of the D.C. current led to the control electrode via said resistor must be so high that the passing period of the controllable active element is larger than half the advancing duration. It is thereby achieved that the current of the element starts before the switching diode current has dropped to zero. When using this kind of circuit arrangement with switching diode it is known to effect the first part of the advancing in that the magnetic field of the deflection unit and of the line transformer ceases and a current flows through the switching diode. During the second part of the advancing the controllable active element must furnish the current. The average current led over the resistor 12 therefore must be so high that the angle of current flow of the controllable active element meets this condition known. Therefore the angle of current flow will be larger in general than 180°. Only in circuit arrangements with relatively long returning duration it is possible to make the angle of current flow a little below 180°. In order to use the reduction of the reactive power of the oscillating circuit, achieved due to the invention, in full it is provided in a further embodiment of the circuit arrangement according to the invention to select the ratio of the capacity of the oscillating circuit capacitor 9 to the capacity of the coupling capacitor 10 less than 5 so that this ratio for example is 1 or 2. Of course the coupling capacitor 10 and the oscillating circuit 8/9 can be interchanged in the feeder line as in any series connection so that the capacitor 10 is located between oscillating circuit and ground.

Figure 3:
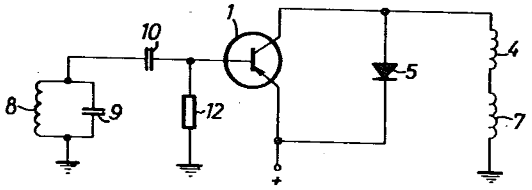
FIG. 3 shows another example in which a transistor is used as controllable active element.

FIG. 3 shows a circuit arrangement in which a transistor serves as controllable active element. This transistor is indicated with 1, the switching diode with 5, the deflection coil with 4, the feed back coil with 7 which is coupled with the inductivity 8 of the oscillating circuit, 9 indicates the oscillating circuit capacitor, 10 the coupling capacitor, 12 the leakage resistor. The necessary bias for the transistor base is furnished through the leakage resistor 12 so that the average value of the current led to the control electrode is so high that the conductive period of the controllable active element is larger than half the advancing period. In this circuit arrangement the feed back coil is series-connected with the deflection unit. However, it may also be series-connected with the switching diode 5 or being inserted into the emitter circuit or the collector circuit respectively, of the transistor. If the feed back coil is series-connected with the deflection unit it is possible, at a suitable magnitude of the sine-voltage across the winding 7, to use this portion of the sine-voltage in addition to the tangential equalisation of the deflection current. Of course the auto-oscillating output stage can also operate together with a line transformer in the way known per se.

Figure 8:
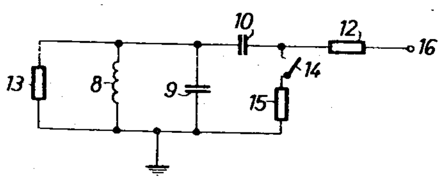
FIG. 8 shows the equivalent-circuit-diagram of the FIGS. 1 and 3.

FIG. 8 shows the equivalent-circuit-diagram of the circuit arrangements according to the FIGS. 1 and 3. 8 indicates the inductivity of the oscillating circuit, 9 the capacity of the oscillating circuit, 13 a negative resistor to relieve the attenuation of the oscillating circuit. This negative resistor performs in said equivalent-circuit-arrangement the generation of the oscillations instead of the active controllable element as a substitute; 14 shows a switch which switches the coupling capacitor, series-connected with the input resistance 15 of the controllable active element, in parallel to the oscillating circuit at a certain portion of the period of the sinusoidal oscillation. When using a tube or a npn-type transistor as a controllable element the terminal 16 receives a positive voltage and, when using a pnp-type transistor a negative voltage. It is thereby achieved that this quantity of charging is led off again which was fed into the capacitor 10 during the period in which the switch 14 was closed. The reactance of capacitor 10 must be higher than the input resistor 15 to such an extent that the admissible load of the control electrode is not exceeded and that the impedance of the series connection, consisting of capacitor 10 and resistor 15, attenuates the oscillating circuit only to a minor degree. The impedance of the series-connection of capacitor 10 and resistor 15 shall essentially be capacitive On the other hand, the resistor 12 shall have such a value that in the portion of the cyclical period in which the switch 14 is open, the impedance of the series-connection, consisting of capacitor 10 and resistor 12 is nearly real, and that also in this portion of the cyclical period the oscillating circuit is not essentially attenuated through the resistor 12.

Although one portion of the period as well as the other portion of the period is attenuated to a relatively small degree when considering this dimensioning prerogative, enabling to obtain a very good constancy of the system's frequency, a considerable part of energy is deducted from the oscillating circuit due to the periodic switching-in and -off of the capacitor 10. Like for a parametric amplifier energy is led to an oscillating circuit by switching on and off of a capacitor, energy is here deducted from the oscillating circuit. The quantity of energy to be led to the oscillating circuit therefore corresponds to the energy supplied to a heavily attenuated circuit. This apparent contradiction consists in that the terms attenuation, quality and the like are only defined for linear systems. With a view from the balance of energy the oscillating circuit possesses a very low quality. With regard to the constancy of the frequency, however, it represents an oscillating circuit of a very high quality.

An auto-oscillating output stage possesses the particular advantage, when using transistors, that the power transistor (driver transistor) to initiate the operation can be omitted. When using the auto-oscillating output stage according to the invention the reactive power of the oscillating circuit can be selected so low that a transistor reactance stage with very low power can be used for fine-tuning the oscillating circuit. To this end, however, it is necessary that the transconductance of the output stage transistor and its current amplification are not extremely small.

Figure 2:
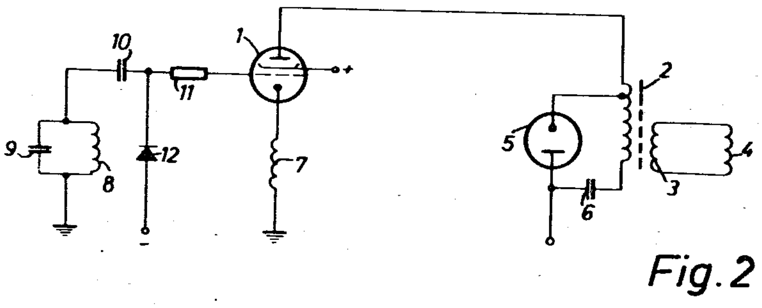
Figure 4:
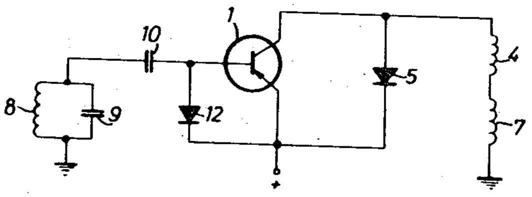
FIG. 4 shows the same circuit arrangement as FIG. 3, but again a diode is used instead of a leakage transistor 12 of FIG. 3.

As already described no attenuation occurs preceivably influencing the frequency stability in the circuit arrangements according to FIGS. 1 and 3, but only a "parametric" attenuation for which—like for a common heavy attenuation—relatively much energy must be led to the oscillating circuit. In order to reduce said parametric attenuation considerably too, enabling to reduce the number of feedback winding turns essentially, whereby the already small influence of said feedback winding turns on the linearity of the deflection can now completely be neglected, it is proposed further to use a diode 12 instead of the leakage resistor 12 shown in the FIGS. 1 and 3, said diode inserted in parallel to the input of the controllable active element and open, i.e. conductive during the blocking period of the controllable active element. The respective circuit arrangement examples are shown in FIGS. 2 and 4; thereby FIG. 2 corresponds to FIG. 1 and FIG. 4 corresponds to FIG. 3. By this measure it is achieved that the (coupling-)capacitor of the control electrode of the controllable active element is in parallel to the oscillating circuit during its non-conductive as well as during its conductive, so that switching over of the inherent frequency of the oscillating circuit within the cycling period is avoided, thus not only the parametric attenuation is deleted but the additional advantage is obtained that the voltage at the oscillating circuit is a pure sine-oscillation, resulting again in a pure sine-oscillation by differentiation. Said differentiated sine-oscillation can advantageously be used to operate a reactance stage which may serve to precision-tune the oscillating circuit.

When using a transistor as a controllable active element—as shown in FIG. 4—the maximum base-blocking voltage of the transistor cannot be exceeded.

In FIG. 2 indicates 1 the line output stage, i.e. the controllable active element, 2 indicates the line transformer with a secondary winding 3, fed from the deflection unit 4, 5 is the switching diode, and 6 the booster-capacitor. This part of the arrangement, connected with the plate of the output stage, has nothing directly to do with the object of the invention. 7 indicates a feed back winding inserted into the cathode circuit, coupled with the induction coil 8 of the oscillating circuit. 9 indicates the capacitor of said oscillating circuit. The oscillating circuit voltage is led to the control grid of the tube via capacitor 10. Directly in front of the control grid a resistor 11 is provided, the resistance value of which can be neglected with regard to the circuit arrangement and only serves to suppress VHF-oscillations. Between the connection of the components 10 and 11 and a negative voltage which corresponds to the maximum required blocking voltage, a diode 12 is inserted as object of the invention, which diode is poled in such a way that it becomes conductive when the tube 1 is blocked, so that the capacitor 10 is in parallel to the oscillating circuit 8, 9, via the diode 12, with regard to the alternate current, during the locking interval of tube 1, and during the conductive period of tube 1 in parallel to the oscillating circuit 8, 9 via the negligible small resistance 11 and the grid-cathode path of tube 1.

FIG. 4 shows another example according to the invention, in which, contrary to the example explained with FIG. 2, a transistor 1 is used instead of the tube 1. When using a transistor as controllable, active element the application of the diode circuit arrangement according to the invention is considerably more suitable and simpler than for the arrangement with a tube, shown in FIG. 2, because the negative bias for the diode can be omitted.

FIG. 4 shows as a controllable, active element a transistor 1, the switching diode 5, the deflection coil 4, the feed back coil 7, coupled with the induction coil 8 of the oscillating circuit, the oscillating circuit capacitor 9, the coupling capacitor 10, and the diode 12 according to the invention.

In order to save the diodes 12 required in the circuit arrangements of FIGS. 2 and 4 and to obtain nevertheless the advantage of these circuit arrangements, viz. to avoid the parametric attenuation, it is provided furthermore to use a transistor as controllable active element, the input resistance is essentially smaller, not only in the conductive direction of the transistor, but also in its blocking or non-conductive direction, than the reactance of the (coupling-)capacitor, after having overcome a Zener-voltage as low as possible.

Figure 5:
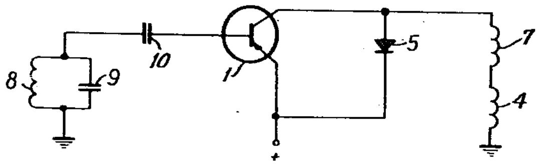
FIG. 5 shows another example, using a transistor as controllable active element, said transistor having a defined characteristic of its input resistance.

FIG. 5 shows an example of the circuit arrangement. The controllable active element 1 is a transistor the input resistance of which has a characteristic curve with a low Zener-voltage. 4 is the winding of a line transformer or the deflection coil; 5 is the diode for switching; 8 and 9 is the sinusoidal oscillating circuit; 10 represents the coupling-capacitor and 7 is the feedback winding through which the oscillating circuit receives the necessary energy.

Figure 6:
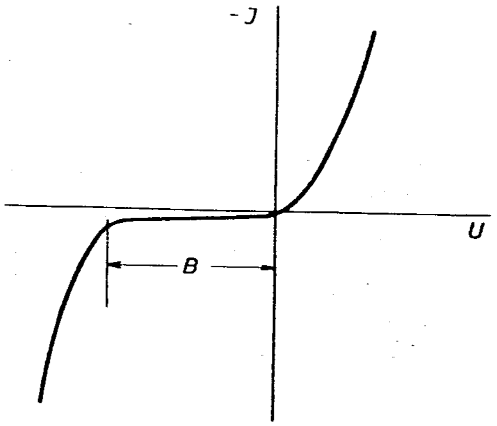
FIG. 6 shows the required characteristic of the input resistance of the transistor line-output stage of FIG. 5.

FIG. 6 shows the required characteristic of the input resistance of the line-output stage transistor. The voltage range B is therein the Zener-voltage which should be low as compared with the sine-voltage.

In case of a particularly low Zener-voltage it is also possible to use a series-type oscillating circuit as oscillating circuit, whereby the coupling-capacitor 10 simultaneously serves as capacitor for the oscillating circuit.

Figure 7:
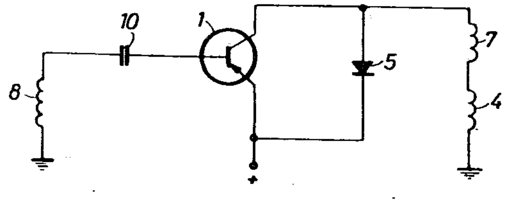
FIG. 7 shows a somewhat modified example of FIG. 5, viz. the oscillating circuit is a series-connected oscillating circuit whereby the coupling capacitor simultaneously serves as capacitor for the oscillating circuit. The same references as in FIG. 5 are used for the same components.

FIG. 7 shows such an example of a circuit arrangement. The same references are used as in FIG. 5 to mark the same components.

While I have described above the principles of my invention in connection with specific apparatus, it is to be clearly understood that this description is made only by way of example and not as a limitation to the scope of my invention as set forth in the objects thereof and in the accompanying claim.

What I claim is:

A self-oscillating horizontal deflection circuit comprising:

a transistor having its emitter connected to a source of potential;

a switching diode connected between the collector of said transistor and said source of potential;

a feedback winding and a deflection coil serially connected between the collector of said transistor and ground;

an oscillating circuit comprising an oscillating circuit capacitance connected in parallel with an inductance, one common terminal of said circuit is grounded, and said inductor is magnetically coupled to said feedback winding;

a coupling capacitor serially connected between the base of said transistor and the other common terminal of said oscillating circuit, the ratio of the capacity of the oscillating circuit capacitor to the capacity of the coupling capacitor is less than five, and the reactance of said coupling capacitor is sufficiently large so that the input resistance of said transistor is essentially smaller during the conductive period of said transistor and essentially larger during the cut-off period of said element; and a control diode inserted between the base and emitter of said transistor to control the base thereof, said control diode is conductive during the blocking period of said transistor.

(References on following page)

References Cited

UNITED STATES PATENTS

| | | | |
|---|---|---|---|
| 2,004,171 | 6/1935 | Muth et al. | 250—36 |
| 2,631,240 | 3/1953 | Gruen | 331—151 X |
| 2,854,602 | 9/1958 | Boekhorst | 315—27 |
| 2,891,192 | 6/1959 | Goodrich | 315—27 |
| 3,059,141 | 10/1961 | Fischman | 315—27 |
| 3,136,955 | 6/1964 | Binkis | 331—8 |

OTHER REFERENCES

The Radio Amateur's Handbook, by the A.R.R.L., 40th ed., 1963, pp. 96–97.

JOHN W. CALDWELL, *Primary Examiner.*

DAVID G. REDINBAUGH, *Examiner.*

T. A. GALLAGHER, *Assistant Examiner.*